United States Patent [19]
Lambert et al.

[11] Patent Number: 4,676,569
[45] Date of Patent: Jun. 30, 1987

[54] PROTECTIVE COVER FOR CABLE TELEVISION DISTRIBUTION TAPS

[76] Inventors: Harry S. Lambert, 2073 Plainfield, Muskegon, Mich. 49441; Daniel J. VanDam, 1519 Hansen, Muskegon, Mich. 49445

[21] Appl. No.: 799,806

[22] Filed: Nov. 20, 1985

[51] Int. Cl.⁴ .................................. H01R 13/44
[52] U.S. Cl. ...................... 439/133; 439/892; 439/306
[58] Field of Search ............ 339/37, 39, 83, 82, 339/87, 36

[56] References Cited

U.S. PATENT DOCUMENTS

| | | | |
|---|---|---|---|
| 2,763,707 | 9/1956 | Soderberg | 174/50 |
| 3,279,838 | 10/1966 | Hamilton | 292/251 |
| 3,573,702 | 4/1971 | O'Keefe | 339/37 |
| 3,636,498 | 1/1972 | McQuarrie | 339/39 |
| 3,666,134 | 5/1972 | Rauch | 174/50 |
| 3,760,130 | 9/1973 | Ross et al. | 339/37 |
| 3,784,727 | 1/1974 | Haubein | 174/50 |
| 3,792,414 | 2/1974 | Smith | 339/39 |
| 3,812,279 | 5/1974 | Voegeli | 339/88 R |
| 3,953,097 | 4/1976 | Graham | 339/37 |
| 4,053,195 | 10/1977 | Laverick et al. | 339/37 |
| 4,144,729 | 4/1979 | Nielsen, Jr. | 70/63 |
| 4,168,921 | 9/1979 | Blanchard | 339/37 |
| 4,339,629 | 7/1982 | Stanmore | 174/50 |
| 4,382,649 | 5/1983 | Meyer | 339/39 |
| 4,392,076 | 7/1983 | Ishler et al. | 339/83 |
| 4,422,314 | 12/1983 | Cooper | 70/242 |
| 4,469,386 | 9/1984 | Ackerman | 339/37 |

Primary Examiner—Eugene F. Desmond
Assistant Examiner—Paula A. Austin
Attorney, Agent, or Firm—John A. Waters

[57] ABSTRACT

A protective, tamper-resistant cover for an elevated CATV distribution tap that is mounted on an elevated CATV signal line comprises top and bottom sections that fit over and under the tap and are joined together at a junction between the sections to enclose the tap. The cover includes side openings for the CATV signal cable and for local signal cables that permit the sections to be fitted on and removed from the tap without disconnecting the signal cables from the tap. These openings are remote from the terminal connectors for these cables so as to impair access to the terminal connectors. The top and bottom sections are releasably fastened together by concealed, tamper-resistant fasteners that extend between the sections. The fasteners fit through rounded ears that resist breakage.

12 Claims, 7 Drawing Figures

PROTECTIVE COVER FOR CABLE TELEVISION DISTRIBUTION TAPS

BACKGROUND OF THE INVENTION

This invention relates to an improved water resistant, tamper-resistant protective cover for cable television distribution taps.

The use of cables to transmit television signals has greatly increased. The cables carrying the main signals are dispersed throughout a neighborhood, generally by hanging the cables along already established utility lines. Then at various points, distribution taps are positioned to service the individual residences. Each distribution tap is designed to service one or more than one residence. Generally, the distribution taps are supported by support cables, and each distribution tap contains one to eight ports for residences in the immediate area.

Once service is initially requested, a lead wire or local cable is run from one port in the distribution tap to the individual residence. If the customer later decides to discontinue cable service, the lead wire is merely disconnected by the cable company at the tap. The lead wire is not completely removed, in the event the customer decides to have the service reconnected at a later time. A locking device can be screwed on the port to prevent the customer from reconnecting the service himself.

Additionally, various cable networks carry electronically scrambled signals for various special channels that are available at an extra price. When a scrambled channel is desired, a descrambler is attached to the customer's port in the tap, and the lead wire is in turn attached to the descrambler.

All too often, after the cable service has been disconnected at the customer's request, the customer or a new customer reconnects the lead wire to the tap without authorization. This is possible because the lead wire is not taken down, but is left near the tap to avoid expense if reconnected. Further, many electronic descramblers (decoders) have been taken, usually by simply breaking them off the tap, which in turn breaks the port connector on the tap. This results in major repair expense and lost revenues from potential subscribers who steal or purchase the stolen decoders. Consequently, it is desirable to have a protective, tamper-proof covering to prevent any unauthorized access or damage to the distribution tap.

It is therefore an object of this invention to provide a protective covering for a cable television distribution tap that reduces or eliminates any theft of cable service or signal decoders. A further object is to provide a cover that protects the tap against deterioration resulting from salt spray, acid rain and precipitation. This reduces maintenance cost and repair time.

It is a further object of this invention to devise a tamper-proof covering which eliminates the need for locking protectors, such as locking terminator for taps and shields for decoders, to prevent unauthorized use of the taps and decoders. Another object of the inventions is to provide a tamper-proof tap cover that eliminates the need for locking terminators and decoder shields as well as the special tools to install and remove these devices.

SUMMARY OF THE INVENTION

The invention is a protective weather and tamper-resistant cover for an elevated cable television (CATV) distribution tap comprising a lid member designed to fit over the upper portion of a cable television distribution tap and an elongated base member designed to fit over the underside of the distribution tap and mate with the lid member to seal the distribution tap therein. The lid member has a slot that accommodates the coaxial cable of a CATV system and any supporting wires. The lid member also has a plurality of ears containing a unique fastener receiving means. The base member has a plurality of ears containing recessed fastener receiving means, the ears corresponding to the lid member ears. The base also contains a plurality of lead wire apertures. The two members are secured to each other by a fastener means.

The fastening means comprises a threaded fastener having a head with a predetermined number and placement pattern of openings therein. A corresponding tool having a mating pattern of prongs that fit in the openings used to insert and extract the bolts.

These and other advantages of the present invention will hereinafter appear, and for purposes of illustration, but not of limitation, a preferred embodiment of the present invention is described in detail below and shown in the appended drawings.

DETAILED DESCRIPTION OF THE PREFERRED EMBODIMENT

Figure 1:
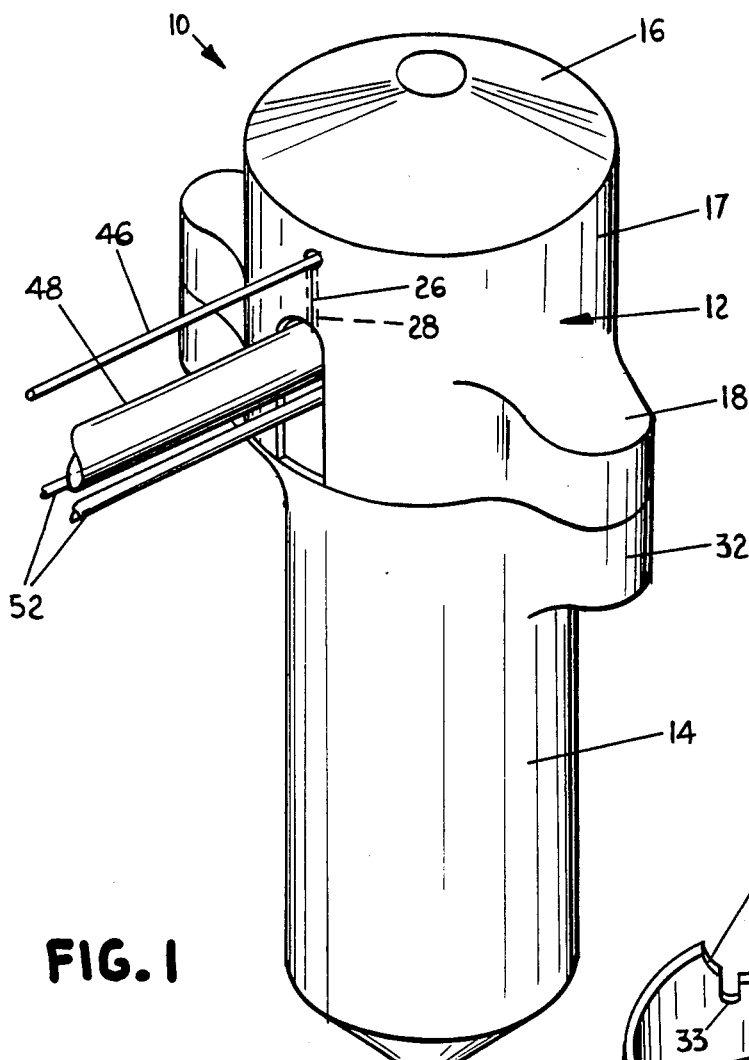
FIG. 1 is a perspective view of the tamper-proof cover of the present invention.

Referring now to FIG. 1, a protective cover 10 constructed in accordance with the present invention contains a lid or top member or section 12 and a base or bottom member or section 14. The members may be constructed out of a light-weight plastic or any other suitable material. Polyvinylchloride ("PVC") is desirable because it does not become brittle and resists cracking at low outside winter temperatures. Moreover, the material has limited shrink and expansion characteristics and is durable and penetration resistant. The base or bottom member 14 fits into the lid or top member 12 to prevent the infiltration of salt spray, acid rain, and precipitation. This also makes the cover more tamper resistant.

Figure 2:
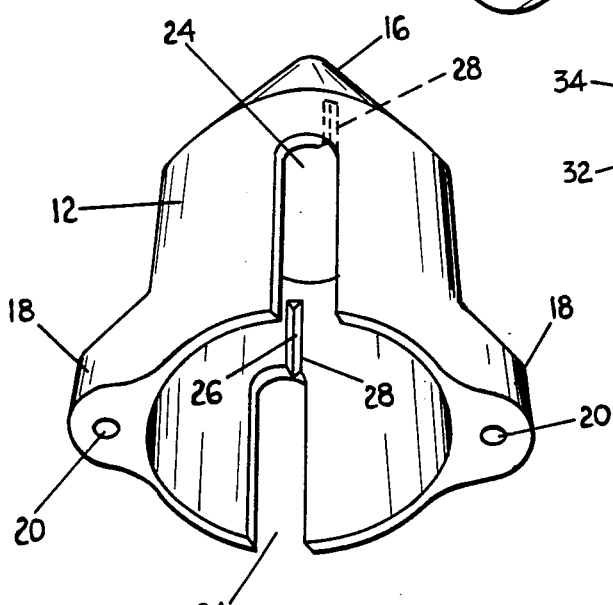
FIG. 2 is a perspective view of the top member of the protective cover.

As shown in FIG. 2, top member 12 is generally a cylindrical tube with a dome shaped top 16 with depending peripheral sidewalls 17. Extending outwardly from the sidewalls of the top member 12 are ears 18. The ears 18 contain a threaded opening 20 for receiving fastener 58. The ears are relatively wide and have a rounded outer contour with no grippable edges or flat sides. Thus, a gripping tool such as pliers cannot be used to break off the ears and open the cover.

The top member 12 also contains an upwardly extending slot or groove for accommodating a CATV Signal cable 48 and any supporting wires 46. The slot has a generally U-shaped cable slot 24. The width of slot 24 is approximately equal to the outside diameter of the CATV Signal cable 48 to effectively seal the slot means against the elements.

Extending upwardly from slot 24 is another slot or groove 28 for the support cable. Slot 28 is a thinner section of sidewall in the form of a channeled recess. The channeled recess 28 is V-shaped and is of a width approximately equal to the diameter of the cable support wire 46. The outer edge of the recess can be so thin that it is easily separable when the top is pushed downwardly over the cables to form a slit 26. Alternatively, slit 26 can already be formed at the thinnest spot. In either case the thinner portion of the cover on the opposite edges of slot 28 form resilient flaps that extend across the slot and resist water infiltration. When the support wire is inserted through slit 26 located at the bottom of the V-shaped recess 28, the flaps deflect out of the way to permit insertion and then return to their original position to cover the slot and tightly grip the wire, thereby forming a seal to the elements.

Figure 3:
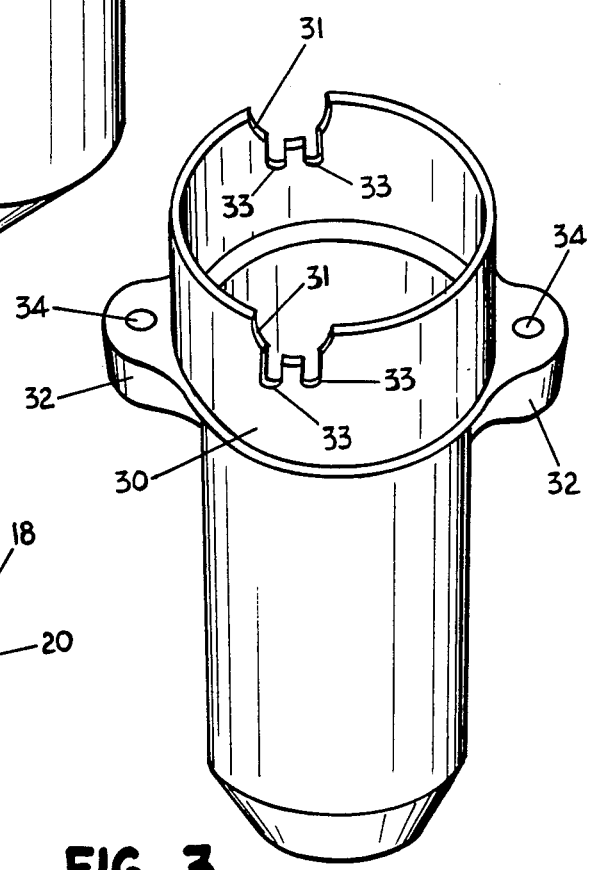
FIG. 3 is a perspective view of the bottom member of the protective cover.

FIG. 3 refers to base member or bottom 14, which is generally shaped like an elongated cylindrical tube. At the top of the base member 14 is a cylindrical collar 30 of slightly less diameter than the inner diameter of top member 12 such that the collar 30 slidingly fits inside of the lower portion of top member 12. Collar 30 has grooves or slots 31 formed therein for the CATV signal cable, with each slot having two slots 33 that serve as exit openings for local signal cables 52.

Figure 4:
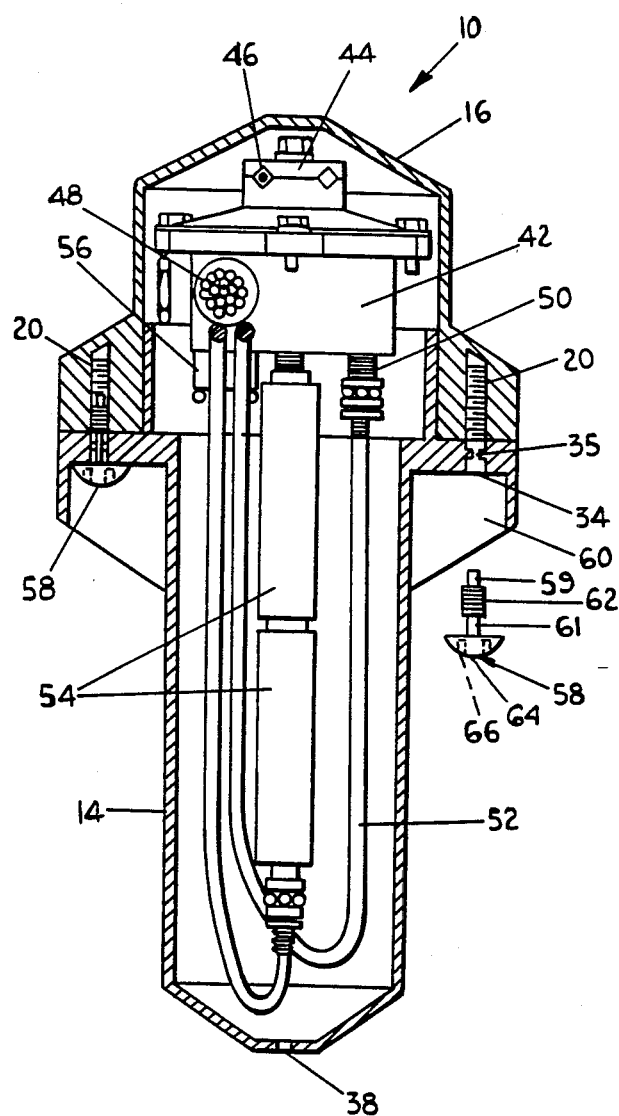
FIG. 4 is a sectional view along line 4—4 of FIG. 1, with the distribution tap in place therein, and showing the position of the fasteners.
Figure 7:
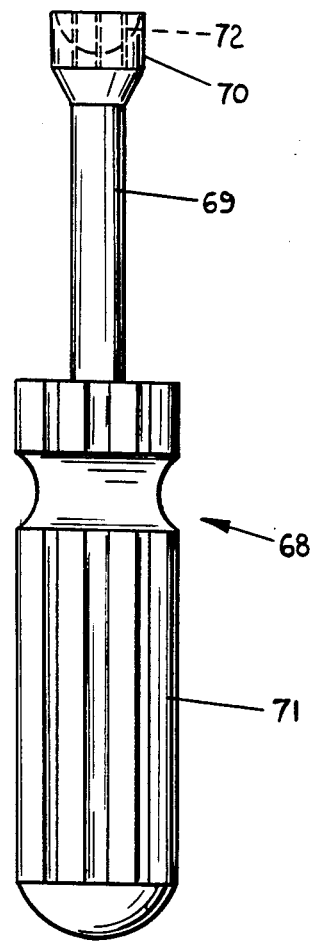
FIG. 7 is a side view of the tool used to insert and extract the fastener means.
Figure 5:
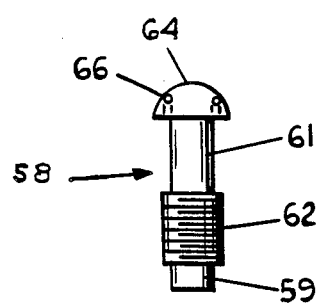
FIG. 5 is a side view of the fastener means.
Figure 6:
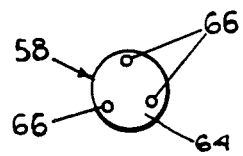
FIG. 6 is a top view of the fastener means.

Extending outwardly from bottom member 14 are rounded ears 32, which correspond to ears 18 in top member 12. The ears contain a fastener opening 34 for the shaft of a fastener, which may or may not be threaded. Further, as shown in FIG. 4, the fastener opening 34 may contain a thin neck 35 to facilitate holding threaded fastener 58 therein. The underside of ears 32 is provided with a recess 60 that leads to opening 34. The recess conceals the fastener head from easy observation. The dome shaped bottom 37 of base member 14 contains a drain opening 38 for water.

As shown in FIG. 4, the cover 10 completely surrounds a cable television distribution tap generally designated as 42. The distribution tap is suspended from support wire 46 by a clamping means 44. The distribution tap 42 is connected in the main signal cable 48 for the CATV signal. Tap 42 contains a plurality of ports 50. Each local signal cable 52 for an individual user is connected to a port 50 by mating connectors (a threaded connector) on the tap and the end of the cable. The local cables extend downwardly and then upwardly so as to pass through the openings 33 at the upper end of the bottom member and run to the individual residences being serviced by the cable television system. This makes it possible to remove and install the cover without disconnecting the local signal cable. The openings 33 are remote from the ports so the local cable connectors cannot be accessed through the openings.

The bottom member is formed in a downwardly elongated shape so that descramblers 54 for limited access CATV channels cna fit in the cover and be connected to ports 50 and thence to the local cable 52 inside the cover 10 so that they cannot be tampered with. A freely rotatable sleeve 56 is normally put on any unused port to prevent an unauthorized connection of a local cable to the tap. This is no longer necessary because of the enclosure's security. A standard terminator can be used if desired.

A threaded fastener 58 is inserted through fastener opening 34 and threaded into fastener opening 20 to secure the bottom member 14 to top member 12. When in place, each fastener 58 is completely concealed in recess 60, thereby restricting the view of and access to the fastener to prevent unauthorized entry and preventing weather damage.

Fastener 58 contains a shaft with a threaded portion 62 and an enlarged head 64. A plurality of openings 66 are formed at predetermined spaced locations in head 64. A tool 68 for inserting and retracting the threaded fastener 58 from cover 10 contains a shaft 69 with a handle 71 on one end and head 70 on the other end that mates with fastener head 68. The inside of head 70 contains prongs 72 which corresponds to the openings in head 64 of the fastener 58 so that the tool can grip the head of the fastener to remove and insert it. The number and special pattern of openings can be varied in the fasteners used in different geographical areas so each tool can be used in only one geographical area. This increases the security of the device. The fastener has left hand threads to further improve security.

Fastener 58 has narrow sections of shaft 59 and 61 on each side of the threads. Section 59 helps seat the fastener in opening 20. When the fastener is threaded through neck 35, the narrow section of shaft 61 lets the fastener hang in the neck 35 when the top is removed, thus preventing the fastener from falling out of the opening. This is helpful when the repairman is working on the unit on a utility pole.

Other types of fasteners or locks to latch the top and bottom members together are possible. The threaded fastener disclosed, however, is effective and relatively inexpensive.

The foregoing is a description of various embodiments of the present invention but should not be read in a restrictive sense but only as explaining the underlying concepts. The invention may be further developed within the scope of the following claims.

The embodiments of the invention in which an exclusive property of privilege is claimed are defined as follows:

1. A protective, tamper-resistant cover for a CATV distribution tap that is mounted on an elevated CATV signal line comprising a top section that fits over the tap and a bottom section that fits under the tap, the top and bottom sections fitting together at a junction between the sections and enclosing the tap, the cover including side openings for the CATV signal cable, with the side openings being formed such that the sections can be fitted on and removed from the tap without disconnecting the signal cables from the tap, the top and bottom sections being releasably fastened together by concealed, tamper-resistant fasteners that extend between the sections.

2. A cover according to claim 1 wherein the CATV signal cable openings comprise grooves in at least one section that extend away from open sides at the junction between the sections, such that the section fits over the cable as it fits over the tap, the tap being suspended from a relatively narrow support cable running above the CATV signal cable, the tap being clamped to the support cable, the top section of the cover including downwardly extending peripheral sidewalls that fit over the tap, a groove for the CATV signal cable being formed in the top section of the cover, the top section further including an upwardly extending narrow section having a thin and easily rupturable sidewall, the narrow section being in line with the support cable, such that the support cable can fit in the narrow section and rupture the sidewall as the top section is fitted downwardly over the support and CATV signal cables, the portion of the narrow section of sidewall lying below the support cable after the cover has been mounted on the tap resiliently extending across the ruptured gap in the sidewall to protect the interior of the cover from exposure to the elements.

3. A cover according to claim 1 wherein the cover sections are integrally molded from a tough, penetration resistant moldable plastic material that resists becoming brittle at low temperatures.

4. A cover according to claim 1 wherein the top and bottom sections include mating ears projecting outwardly therefrom at the junction between the section, the ears having openings therein that receive the fasteners.

5. A cover according to claim 4 wherein the ears have a rounded outer profile that resists gripping by pliers or similar gripping tool, such that the ears cannot easily be gripped with a tool and broken off.

6. A cover according to claim 5 wherein the ear on the bottom extends downwardly from the junction and includes a recess that extends upwardly from the bottom thereof, with a narrower fastener opening extending through the ear from the top of the recess, the fastener comprising a threaded fastener with an enlarged head that fits in the recess and a narrower shaft that fits through the fastener opening, the mating ear on the top including a mating threaded opening that receives the fastener, the head of the fastener being concealed in recess in the lower ear.

7. A cover according to claim 6 wherein the fasteners and fastener receiving openings employ left hand threads.

8. A cover according to claim 5 wherein the head of the fastener includes a surface designed to be gripped by a tool for axial rotation, the tool comprising a rotatable shaft with a tool head that fits against the fastener head, with a predetermined number of spaced prongs extending from predetermined locations on the tool head, the fastener head including mating openings that receive the prongs.

9. A cover according to claim 8 and further comprising a plurality of fasteners and tools that may be used interchangeably with the cover, the spacing and location of the prong openings and mating prongs being varied among different cover fasteners and tools, such that different cover fasteners and tools may be used in different geographic areas and the tools for the particular fasteners will only be useful in the given area in which the mating fasteners are used and will not be usable in every area in which covers employing other fasteners are used.

10. A cover according to claim 1 wherein the tap includes ports for connecting one or more local signal cables to the tap, the ports facing downwardly from the tap and receiving local cables upwardly by means of connectors joining the local cables with the ports, the cover including exit openings for the local cables that are located at a location remote from connectors for attaching the local cables to the ports, such that the connectors are not readily accessible through the exit openings for connecting or disconnecting the local cables.

11. A cover according to claim 10 wherein the exit openings are located at the side of the cover adjacent the junction between the cover sections, the openings being positioned such that the cover sections can be removed from the tap without disconnecting the local cables from the tap.

12. A cover according to claim 11 wherein the CATV signal cable and local cable openings comprise slots in at least one of the cover sections that extend away from the edge of the section adjacent the junction between the cover sections, with the grooves sliding over the cable as the cover section is fitted on the tap, the local cables hanging downwardly from the ports and then extending upwardly and outwardly through said side openings, the bottom having sufficient downward clearance to enclose a tap wherein the local cable is connected to a decoder extending downwardly from the tap, the decoder thus being protected by the cover.

* * * * *